United States Patent [19] [11] 4,316,113
Sato et al. [45] Feb. 16, 1982

[54] ELECTRIC ROTARY MACHINE
[75] Inventors: Masaki Sato; Hironori Okuda; Motoya Ito; Yuji Makino; Yasuyuki Wachi; Noriyoshi Takahashi; Masatoshi Watanabe, all of Hitachi, Japan
[73] Assignee: Hitachi, Ltd., Tokyo, Japan
[21] Appl. No.: 41,647
[22] Filed: May 23, 1979
[30] Foreign Application Priority Data
May 24, 1978 [JP] Japan ................. 53/61007
[51] Int. Cl.³ .............................................. H02K 1/22
[52] U.S. Cl. ...................................... 310/262; 310/265
[58] Field of Search ............... 310/216, 218, 254, 261, 310/262, 258, 259, 265, 52, 51
[56] References Cited
U.S. PATENT DOCUMENTS
982,784   1/1911  Behrend et al. ................. 310/262 X
1,685,739 9/1928  Brown ................................ 310/262
2,991,380 7/1961  Pfleger ................................ 310/262
3,229,134 1/1966  Rakula ............................ 310/265 X
3,988,622 10/1976 Starcevic ........................ 310/258 X Primary Examiner—Donovan F. Duggan
Attorney, Agent, or Firm—Craig and Antonelli

[57] ABSTRACT

An electric rotary machine is provided with a stator having a stator core of laminated iron plates with a given lamination thickness in an axial direction of the machine and a stator winding wound around the core and a rotor rotatably disposed inside the stator, having a rotor core and a rotor winding. The axial length of the stator core is selected with respect to that of the rotor core in such a way that, when the rotor is thermally extended, the end of the rotor core never extends beyond the end of the stator core. With such a constructional arrangement, there is eliminated an excessive temperature rise at the ends of the stator core, and prevented an insulation deterioration of the stator winding and the burning of the stator core.

4 Claims, 11 Drawing Figures

U.S. Patent  Feb. 16, 1982  Sheet 1 of 3  4,316,113
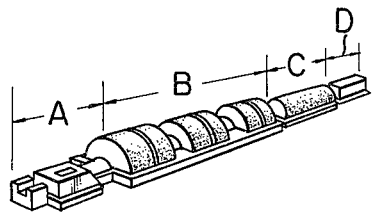
FIG.1
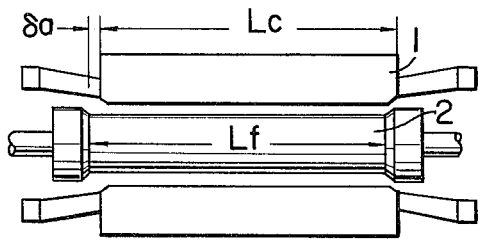
FIG.2A
PRIOR ART
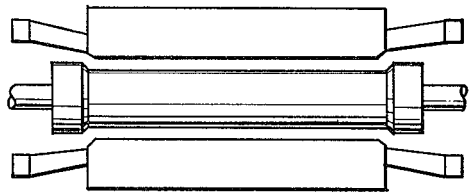
FIG.2B
PRIOR ART
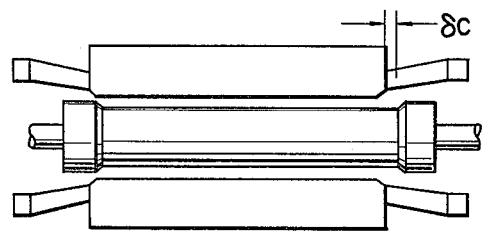
FIG.2C
PRIOR ART
FIG.3
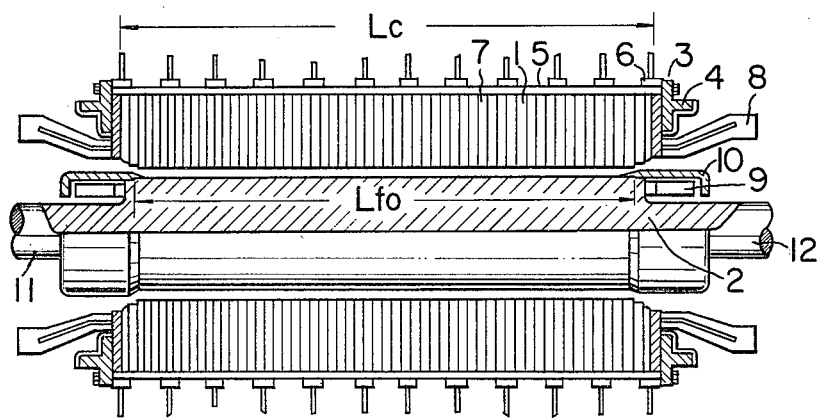

ELECTRIC ROTARY MACHINE

BACKGROUND OF THE INVENTION

The invention relates to improvement of an electric rotary machine and, more particularly, to an electric rotary machine free from local over-heating at the ends of its stator core.

In general, a generator, for example, is directly coupled through its a rotary shaft with the shaft of a prime-mover so that mechanical energy transmitted through the rotary shaft from the prime-mover is converted into electrical energy. The prime-mover for a large capacity generator in a heat power plant, for example, generally employs a steam turbine. In order to convert the heat energy of steam at high pressure and temperature into mechanical energy, with high efficiency, the turbine should preferably be driven at high speeds. It is for this reason that the turbo-generator employed is usually a high speed rotary machine with two- or four-poles rotating at 3000 rpm or 1500 rpm for 50 Hz 3600 rpm or 1800 rpm for 60 Hz. Such a high speed generator cannot avoid a great centrifugal force developed in the rotor. For this reason, it is more preferable for the generator to be longer in its axial length and smaller in its diameter. The rotor is thus constructed as a nonsalient pole type mounted on a cylindrical forged shaft. Of course, the axial length of the rotor is limited because if it is excessively narrow and/or long, the shaft tends to greatly bend, causing a great vibration of the machine. Accordingly, the axial length must be selected suitably. Though such is the case, the entire axial length of the generator system including a single high pressure turbine and two low pressure turbines comes up to 50 m for a system of 500 to 600 MW and 65 m for a system of 1,100 to 1,200 MW.

Referring now to FIG. 1, there is shown an outer appearance of a turbo-generator coupled to a turbine system including a section A for a high pressure turbine, and a section B for three low pressure turbines, thus forming a so-called four-chamber turbine. A section C indicates a generator of which the rotary shaft is directly coupled with the shaft of the turbine system. A section D indicates an exciter section such an exciter, serving as an auxiliary machine of the generator. As mentioned above, the turbo-generator has a long axial length and is driven by high temperature steam of 500° C. or more. It therefore suffers from a large thermal expansion. Particularly, since the rotary shafts of the turbine section and the generator section are directly coupled to each other, the thermal expansion of the rotary shaft of the turbine section affects the generator section. For this, the rotor of the generator is installed with precautions to compensate for a thermal expansion of the rotary shaft of the system.

FIGS. 2A, 2B and 2C show the relative axial locations of the stator and the rotor at three different operating states. Generally, in an electric rotary machine, the core lengths of the rotor and stator are determined in consideration of the respective magnetic loadings and the electric loadings. In the conventional rotary machine, the length $L_c$ of the stator core 1 is determined to be substantially equal to the effective length $L_f$ of the magnetic pole of the rotor 2 (referred to as a rotor effective length hereinafter).

As described above, the turbo-generator is installed by taking into consideration the thermal expansion of the rotor. In a conventional turbo-generator, therefore, the axial center of the rotor core 2 is shifted with respect to the axial center of the stator core 1 at no load condition. That is, the rotor is driven at no load in such a state that the rotor effective portion is projecting by $\delta_a$ from the stator core toward the turbine side, as shown in FIG. 2A. When the generator is driven at a rated output state, the rotor is subjected to the thermal extension of the turbine rotor and moved to a position where the axial center of the rotor 2 is substantially coincident with the axial center of the stator core 1, as shown in FIG. 2B. As a result, the offset as indicated by $\delta_a$ in FIG. 2A disappears. Also, it is possible that due to sudden change of the generator load or other possible conditions the rotor shaft moves and, in some cases, the rotor effective portion projects over the corresponding end of the stator core at the side remote from the turbine, as indicated by $\delta_c$ in FIG. 2C. In this way, the generator rotor axially moves so that the rotor effective portion moves in its axial direction within a range defined by $\delta_a$ and $\delta_c$ shown in FIGS. 2A and 2C.

Magnetic fluxes due to the magnetomotive force developed by the armature winding of the stator and the field winding of the rotor appear at the stator core end portion during the normal operation under substantial load. The fluxes concentrate at the tips of the teeth of the stator core, resulting in local overheating of the portions. Particularly, the axially extending magnetic fluxes entering the stator core end faces are normal to the laminated flat steel sheets of the stator core, thereby causing eddy currents which accelerate the local overheat of the stator core. This may lead to the burning of the core or deterioration of the insulation of the stator windings, resulting in lower reliability of the turbo-generator and the associated apparatus. Particularly, the amount of the fluxes axially entering the core end are greatly dependent on the relative position of the rotor effective portion to the stator core or the offset values $\delta_a$ and $\delta_c$ shown in FIGS. 2A and 2C.

Turning now to FIG. 5, there is shown a temperature distribution along the axial direction of the stator core. A curve I shows a temperature distribution when the stator and rotor are positioned as shown in FIG. 2B. The curve I shows that the temperature is higher at the stator core end portion near to the allowable highest value. In the cases where either one end of the rotor effective portion projects outwardly over the stator core end face, as shown in FIGS. 2A and 2C, the amount of the magnetic fluxes entering the stator core end corresponding to the projecting rotor end increases thereby also increasing eddy currents, which in turn increase the thermal energy produced there so that the temperature at the stator core end abruptly rises, as depicted by the curve II. As a result, that portion of the core may be burned and the insulation deterioration of the stator windings at the portion of the stator core may be accelerated. Finally, it may lead to a serious accident preventing normal operations of the turbo-generator, with the result that the reliability of the generator is considerably lowered. A curve III shows a temperature distribution on the side where the rotor end is recessed from the stator core end.

Hitherto, various attempts have been proposed to prevent the stator core end portion from being excessively heated, as disclosed in U.S. Pat. Nos. 4,031,422 issued to A. F. Armor et al on June 21, 1977, entitled "Gas Cooled Flux Shield for Dynamoelectric Machine" and No. 3,731,127 issued to D. B. Harrington on May 1, 1973, entitled "Generator End Tooth Flux Shield" and Japanese patent application No. 52068/76 by Tokyo Shibaura Denki K.K., published before examination on Nov. 11, 1977 as Laying-open No. 135007/77 and entitled "Rotary Machine." In those prior art disclosures, shield plates are disposed near the end portion of the stator core to prevent the magnetic fluxes from entering into the stator core end. However, the shielding effects of such shield plates are usually limited and hence it is difficult to satisfactorily prevent the temperature rise at the stator core end in question.

SUMMARY OF THE INVENTION

Accordingly, an object of the present invention is to provide a reliable electric rotary machine in which the rotor effective portion is arranged so as not to project over the end face of the stator core, thereby preventing the stator core end portion from being subjected to abrupt temperature rise.

To achieve the above-mentioned object, the rotor core of the electric rotary machine of the present invention is made to have an axial length shorter than the axial length of the stator core by a possible longest distance of the axial movement of the rotor due to the thermal expansion during the operation at the maximum load or a sudden change of the load, whereby the rotor effective portion never projects axially over the stator core end.

BRIEF DESCRIPTION OF THE DRAWINGS

FIG. 1 shows a perspective view of an external appearance of a turbo-generator system to which the present invention is applied.

FIGS. 2A, 2B and 2C show various positions of a rotor relative to a stator core in a conventional turbo-generator;

FIG. 3 shows a longitudinal sectional view of an electric rotary machine according to the invention;

DESCRIPTION OF THE PREFERRED EMBODIMENTS

Figure 6:
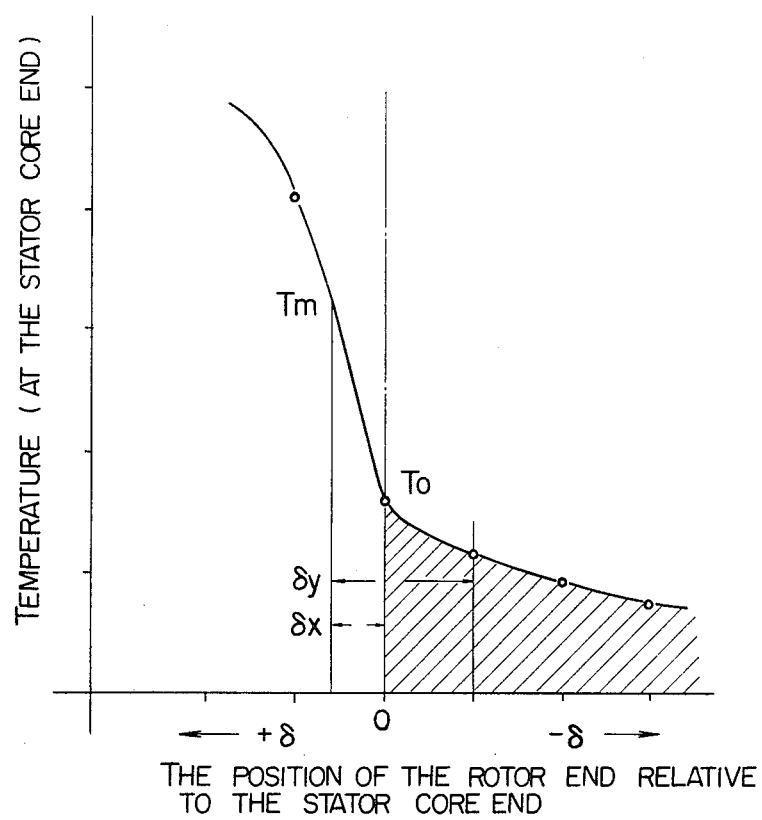
FIG. 6 shows a graph illustrating a temperature variation of the stator core end with respect to the distance of rotor movement in its axial direction.

Before preceding with the explanation of the invention, the results of the experimental study conducted by the inventors will first be given. FIG. 6 shows variation of the maximum temperature rise on the stator core end portion under different locations of the rotor core. $\delta$ indicates an axial deviation of the end face of the stator core from the end of the rotor effective portion and a negative sign indicates that the rotor effective portion is recessed from the stator core end inwardly with respective to the stator core (referred to as a recession), while a positive sign indicates that the rotor effective portion projects outwardly over the stator core end face. Zero point indicates that the stator core end face is aligned with the rotor effective portion.

In the experiment, as the rotor was gradually moved in its axial direction, the maximum temperature rises on the stator core end portion were measured under different positions of the rotor. As a result of the measurement, it was found that when the rotor effective portion projects outwardly over the stator core end face, that is to say, the rotor moves in the direction to increase $+\delta$, the temperature abruptly rises with increasing of $+\delta$. In the conventional case, the rotor axially moves within a range indicated by $\delta_y$ shown in FIG. 6. For this, under the worst condition, the temperature rises up to Tm which is two times as large as To when $\delta=0$.

On the basis of the measurement result, in the present invention, the rotor is made to have its effective length shorter than the stator core length by $2\delta_x$ or more, so that the rotor is recessed by $\delta_x$ from the stator at each end thereof, in order that the end of the rotor effective portion does not project over the end face of the stator core under any load condition.

Turning now to FIG. 3, there is shown an embodiment of a rotary electric machine according to the invention. As shown, a stator core 1 made of a lamination of steel sheets is fastened to a stator frame 6 by fastening bolts 5, through end ducts 3 and end plates 4. The stator core 1 is divided into several blocks with intermediate ducts 7 therebetween for cooling the stator core. The stator core is also provided with slots (not shown) accommodating therein stator windings 8.

The effective length Lfo of a rotor 2, i.e. the axial length of its field core, is shorter by $2\delta_x$ or more than the stator iron core length Lc. Similarly, the rotor 2 is provided with slots (not shown) accommodating field windings 9 therein. The end portions of the field windings are firmly held by a holding ring 10 made of non-magnetic material. The holding ring 10 is shrink-fitted on the end portion of the rotor 2. The rotor 2 is integrally formed with shafts 11 and 12 which are directly coupled with the shaft of a turbine and with the shaft of the current collector and the exciter, respectively.

Figure 4A:
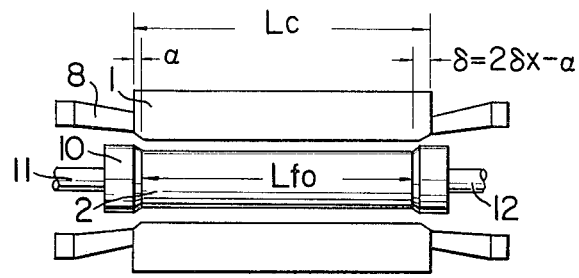
FIGS. 4A, 4B and 4C show various positions of a rotor relative to a stator core in an electric rotary machine according to the invention.
Figure 4B:
Figure 4C:
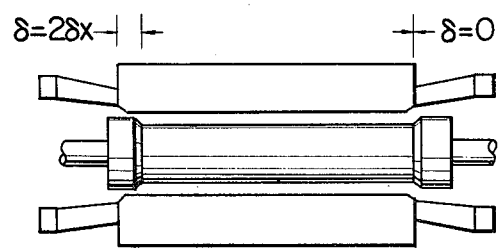

FIGS. 4A, 4B and 4C illustrate different locations of the rotor core relative to the stator core of the generator as shown in FIG. 3. In FIG. 4A illustrating the state of initial installation of the generator, one end of the rotor effective portion closer to the turbine side (referred to as TB side) is offset inwardly by a distance $\alpha$ from the corresponding end of the stator 1, while the other end of rotor effective portion closer to the exciter side (referred to as Ex side) is offset inwardly by a distance $\delta=2\delta_x-\alpha$ from the corresponding end of the stator 1. When the generator operates at the rated output power, the axial center of the stator core is substantially aligned with the axial center of the rotor effective portion, as shown in FIG. 4B, so that the ends of the rotor effective portion are equally apart by a distance $\delta_x$ from the corresponding ends of the stator 1. Further, when the generator load suddenly changes or the rotor shaft is forced towards the Ex side by the movement of the turbine shaft, the rotor comes to a position, as shown in FIG. 4C, where the offset $\delta$ between the opposing ends of the rotor and the stator is $\delta=0$ at the Ex side and $\delta=2\delta_x$ at the TB side. Thus, the rotor effective portion moves by no means outwardly beyond the ends of the stator core under any operating condition of the turbo-generator.

With such an arrangement, the temperature rise at the stator core end portions is less than To in FIG. 6 because the position of the rotor end is restricted within an area with hatching of thin lines in FIG. 6.

The temperature rise To is higher than the temperature at the central part of the stator core but is lower than the allowable maximum temperature rise. No particular problem arises from the temperature rise To. Since there is no situation where the temperature rise exceeds To under any location of the rotor end in the hatching area in FIG. 6, it is assured that the operation of the turbine generator is satisfactorily stable.

Figure 5:
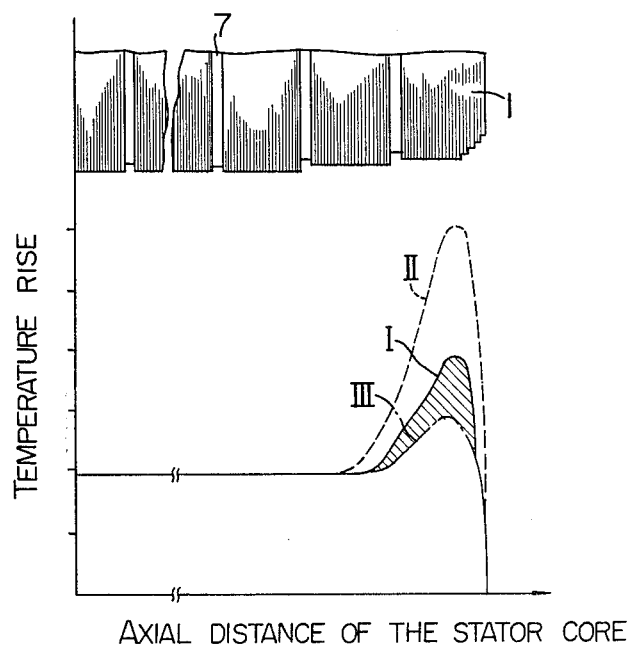
FIG. 5 shows a graph illustrating temperature distributions of the stator core along its axial direction under different conditions.

Returning to FIG. 5, curve I shows a temperature distribution, along the axial direction, of the stator core of the turbo-generator of the invention as shown in FIG. 3 in case of $\delta = 0$ and curve III shows the same in case of $\delta = -2\delta_x$ which occurs when the end of the rotor effective portion is farthest from the corresponding end of the stator core.

Therefore the temperature rise at the stator core ends varies within the area between the curves I and III.

As described above, the temperature rise arising from local over-heat at the stator core end portions can be limited under any condition in axial movement of the rotor by making the rotor effective length Lfo shorter than the stator core length Lc so that the rotor core end never moves beyond the stator core end. Therefore, this arrangement contributes to preventing the burning of the stator core end portions and to preventing the progression of insulation deterioration of the stator windings disposed around there. Therefore, the reliability of the generator is remarkably improved.

The optimum difference $\delta$ between the axial length Lc of the stator core and the effective length Lfo of the rotor core depends on various conditions such as the whole length of the shaft of the electric rotary machine, an amount of the thermal expansion of the shaft and a load condition. However, for a turbo-generator which is generally operated under its normal load condition, the above-mentioned effects are achieved by selecting the length difference $\delta$ to be substantially equal to the width of the air gap g between the opposing surfaces of the rotor and stator. This arrangement provides additional advantageous effects such that a temperature difference between the end portion of the stator core and the central part of the same is reduced substantially to zero so that a substantially uniform temperature distribution is achieved over the entire stator core along its axial direction resulting in greatly reducing the vibration due to thermal distortion of the stator core and also reducing the insulation deterioration of the windings due to the thermal distortion.

Figure 7:
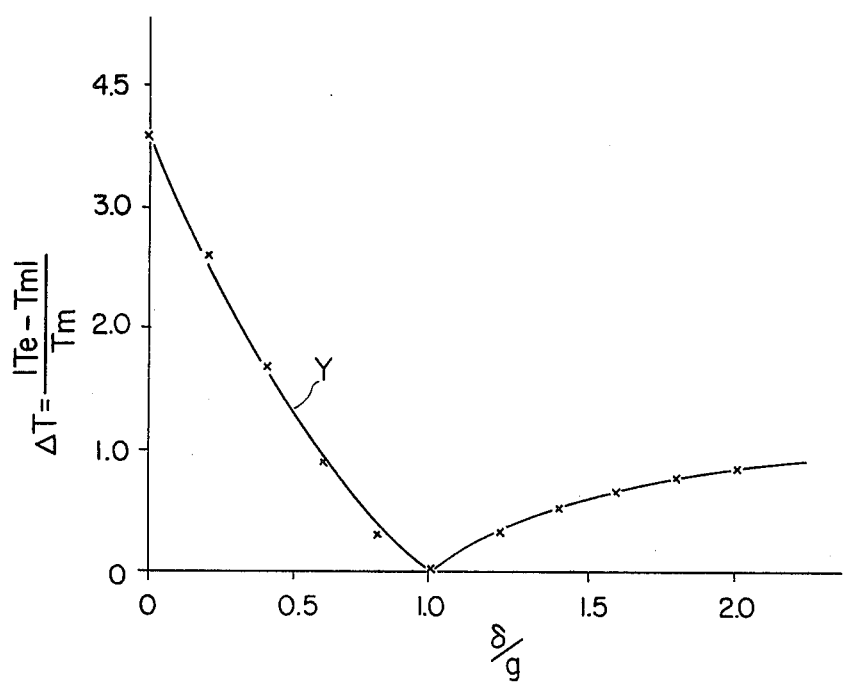
FIG. 7 shows in graphical form a variation of the temperature difference between the end portion and the center portion of the stator core with respect to variation of the difference in length between the rotor core and the stator core.

The determination of the difference $\delta$ is based on a curve Y shown in FIG. 7 obtained from an experimental study by the inventors. The curve Y shows a relationship between a non-uniformity of the temperature distribution defined by $$\Delta T = \frac{|Te - Tm|}{Tm}$$

and a relative length difference defined by $\delta/g$, where Te and Tm are temperatures of the stator core at its end portion and center portion, respectively. In the figure, the variation curve is denoted as Y. As seen from the figure, the temperature non-uniformity is minimum at the point where the gap g is equal to the length difference $\delta$ and increases with variation of the length differences $\delta$ away from the point. In other words, this curve indicates that, if the ratio $\delta/g$ is selected to be about 1, the temperature difference between the central portion and the end portion of the core can be reduced.

As described above, the electric rotary machine according to the invention is so arranged that the rotary effective portion moves by no means beyond the end surface of the stator core. With this arrangement, the magnetic fluxes entering the end surface of the stator core are restricted, which is effective to prevent an abrupt temperature rise at the stator core end which otherwise would occur due to movement of the rotor effective portion to a position where the rotor end projects over the corresponding end of the stator core. As the result, the rotary electric machine is prevented from the burning of the stator core end portion and the insulation deterioration of the stator windings around there, thus greatly improving the reliability of the generator.

We claim:

1. An electric rotary machine comprising:
    a stator having an annular stator core of laminated steel sheets, slots formed to axially extend in peripheral portion of said stator core, and insulated stator windings disposed in said slots and
    a rotor having a rotor axis, a block like rotor core integrally formed with said rotor axis, slots formed to axially extend in peripheral portion of said rotor core, rotor windings fitted in said slots and having end portions axially projecting over the end portion of said rotor core, and a hold ring for supporting the winding end portions against a centrifugal force applied thereto when the rotor is driven, said rotor being axially movable with thermal expansion or shrinkage and/or temperature change of said rotor or a prime-mover directly coupled to said rotor,
    wherein the axial length of said rotor core is shorter than the axial length of said stator core so that any end of said rotor core is prevented from projecting over the corresponding end of said stator core during its operation at one of maximum load and a sudden change of load and, when said electric rotary machine is driven at normal operation, the end portion of said rotor core is recessed from the end of said stator core by a distance substantially equal to a gap between said rotor and said stator.

2. An electric rotary machine comprising:
    a stator having an annular core made of laminated steel sheets and stator windings wound on said core and
    means for reducing the axially extending flux entering the end faces of the core of said stator to reduce eddy currents in said stator comprising at least a rotor having a rotor core and rotor windings wound on said rotor core, said rotor being mounted rotatably within said stator core with an air gap between said stator core and movable in its axial direction with thermal expansion or shrinkage and/or temperature change of said rotor or a prime-mover directly connected to said rotor;
    wherein the axial length of said rotor core is shorter than the axial length of said stator core so that any end of said rotor core is prevented from projecting over the corresponding end of said stator core during its operation at one of maximum load and a sudden change of load.

3. A method for reduction of operating temperature of electric rotary machines having a stator with core and rotor comprising the steps of
constructing said rotor of effective axial length less than the effective axial length of said stator by a predetermined distance and,
limiting during operation of said machine the axial movement of said rotor within said stator such that any end of said rotor is axially displaced from its corresponding end of said stator by a distance no greater than said predetermined distance.

4. A method for reduction of operating temperature of electric rotary machines as set forth in claim 5, comprising the further step of
establishing a substantially uniform temperature over the entire core of said stator to reduce vibration during operation due to thermal distortion of said core of said stator by selecting said predetermined to be substantially equal to an air gap distance between opposing surfaces of said rotor and said stator.

* * * * *